United States Patent
Molin et al.

[11] Patent Number: 5,987,007
[45] Date of Patent: Nov. 16, 1999

[54] MANIPULATION OF HEADER FIELD IN ATM CELL

[75] Inventors: Kim Molin; Petri Havanto, both of Espoo; Harald Kaaja; Olavi Mertanen, both of Helsinki; Juha Pihlaja, Espoo, all of Finland

[73] Assignee: Nokia Telecommunications Oy, Espoo, Finland

[21] Appl. No.: 08/800,326

[22] Filed: Feb. 14, 1997

[30] Foreign Application Priority Data

Feb. 14, 1996 [FI] Finland ................................. 960665

[51] Int. Cl.⁶ .................................................. H04L 12/56
[52] U.S. Cl. ............................................. 370/236; 370/395
[58] Field of Search ................................. 370/229, 236, 370/235, 237, 366, 244, 242, 250, 392, 395, 522, 396, 397, 398, 399, 426, 463, 471, 509, 514, 379

[56] References Cited

U.S. PATENT DOCUMENTS

| | | | |
|---|---|---|---|
| 4,947,388 | 8/1990 | Kuwahara et al. | 370/60 |
| 5,193,088 | 3/1993 | Choi et al. | 370/398 |
| 5,488,606 | 1/1996 | Kakuma et al. | 370/397 |
| 5,515,359 | 5/1996 | Zheng | 370/231 |
| 5,696,764 | 12/1997 | Soumiya et al. | 370/395 |
| 5,768,273 | 6/1998 | Aznar et al. | 370/236 |
| 5,815,737 | 9/1998 | Buckland | 370/397 |

FOREIGN PATENT DOCUMENTS

| | | |
|---|---|---|
| 498 408 | 8/1992 | European Pat. Off. . |
| 647 081 | 4/1995 | European Pat. Off. . |
| 661 851 | 7/1995 | European Pat. Off. . |
| 95/01029 | 1/1995 | WIPO . |

*Primary Examiner*—Hassan Kizou
*Assistant Examiner*—Daniel Previl
*Attorney, Agent, or Firm*—IP Group of Pillsbury Madison & Sutro LLP

[57] ABSTRACT

A method of manipulating the header field in an ATM cell. In accordance with the method, the ATM cell is transferred via an interface where each byte of the cell appears in a parallel form on a plurality of parallel data conductors and where information on the start of cell (SOC) is also available. In order to be able to carry out header bit manipulation in a simple manner at such an interface, data conductors corresponding to the bits to be manipulated are led to a circuit carrying out the manipulation, and the other data conductors are led past the circuit. The bit to be manipulated is searched for by counting from start of cell up to the byte containing the bit to be manipulated, after which the bit is manipulated. An output conductor corresponding to the manipulated bit is led from the manipulation circuit to its own position among the data conductors that bypassed the circuit.

6 Claims, 8 Drawing Sheets

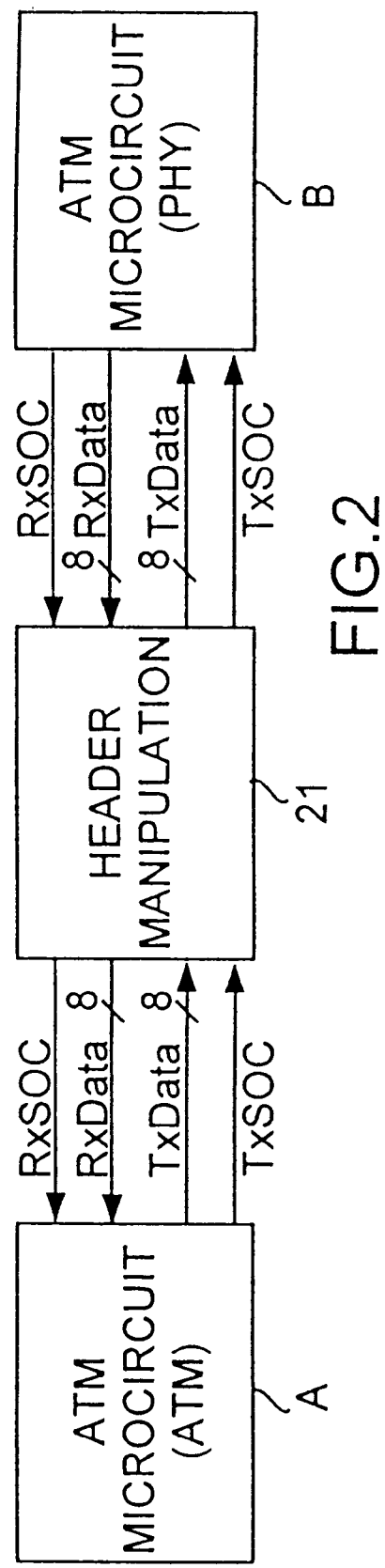

MANIPULATION OF HEADER FIELD IN ATM CELL

BACKGROUND OF THE INVENTION

1. Field of the Invention

The invention relates to a method of manipulating the header field in an ATM cell. The method of the invention is especially intended for changing the value of an EFCI bit. An EFCI bit indicates congestion in an ATM network.

2. Background

ATM (Asynchronous Transfer Mode) is a connection-oriented packet switching technique chosen by the International Telecommunications Union ITU-T as the target solution for the broadband integrated services digital network (B-ISDN). Problems arising in conventional packet networks have been eliminated in ATM networks by starting to use short constant-length packets (53 bytes), called cells.

FIG. 1a shows the basic structure of a cell transmitted in an ATM network. Each cell to be transmitted in the network comprises a 48-byte payload and a 5-byte header, but the detailed structure of the header (its contents) depends on the part of the ATM network being used. This is because the ATM network architecture comprises a plurality of interfaces precisely defined in the standards, and the header structure used in an ATM cell depends on which interface (i.e. which part of the network) is involved.

FIG. 1b shows the structure of the cell header at a UNI interface (User-to-Network Interface), which is an interface between an ATM terminal (such as a computer, a router or a telephone exchange) and an ATM node. FIG. 1c again shows the structure of a header at a NNI interface (Network-to-Network Interface) of an ATM network, which is an interface between two ATM nodes, either inside the network or between two different networks.

The routing field of a cell header is formed by a Virtual Path Identifier (VPI) and a Virtual Channel Identifier (VCI). In the header structure of FIG. 1b, used only in a subscriber line, altogether 24 bits are reserved for the routing field (VPI/VCI). In the header structure of FIG. 1c, used everywhere else in an ATM network, 28 bits are reserved for the routing field (VPI/VCI). As its name implies, a routing field is the basis for cell routing in an ATM network. The virtual path identifier VPI is mainly used in the inner parts of a network and in practice it often determines to which physical connection a cell has to be routed. The virtual channel identifier VCI again is often used in routing only at the periphery of a network, e.g. when FR (Frame Relay) connections are connected to an ATM network. It should, however, be noted that both VPI and VCI are needed to unequivocally determine the route of a cell.

The other fields determined by the specifications in the header of an ATM cell include GFC (Generic Flow Control) intended for control of traffic in a subscriber line, not yet precisely defined, PTI (Payload Type Indicator), mainly used to separate network management cells from subscriber information cells, which can additionally be specified according to whether congestion has or has not been detected on the way, CLP (Cell Loss Priority), employed to giving priorities to cells with regard to probability of loss, HEC (Header Error Control), header check sum.

Especially the PTI field, which can be used to transmit virtual path and virtual channel specific congestion messages, is related to the present invention. As is apparent from FIGS. 1b and 1c, the PTI field comprises three bits, using which a total of eight different values can be indicated. Only part of these values are reserved for user cells (part of the eight values of a PTI field belonging to OAM and RM cells), and consequently in practice the middle bit of the PTI field in user cells is the one whose value indicates if congestion has been detected. This bit is called EFCI (Explicit Forward Congestion Indication). The coding of a PTI field has been defined in the standards in accordance with the following table (EFCI bits are in bold face).

|  | PTI coding | Interpretation |
|---|---|---|
| Bits | 4 3 2 |  |
|  | 0 0 0 | User cell, no congestion (I=0). |
|  | 0 0 1 | User cell, no congestion (I=1). |
|  | 0 1 0 | User cell, congestion (I=0). |
|  | 0 1 1 | User cell, congestion (I=1). |
|  | 1 0 0 | OAM cell |
|  | 1 0 1 | OAM cell |
|  | 1 1 0 | RM cell |
|  | 1 1 1 | Reserved |

As can be seen from the table, the EFCI bit value "1" is used to indicate congestion in user cells. (The parameter I indicates whether the last cell of an upper level packet is concerned or not.) The table also shows that bit No. 4 in the PTI field indicates whether a user cell or another cell is involved.

The structure of an ATM cell is described in ITU-T recommendation I.361 with a more precise description of an ATM cell and its header.

In practice, an ATM device has to be implemented by commercially available ATM microcircuits that typically implement an interface according to the UTOPIA standard defined by the ATM Forum or to a conventional 8-bit parallel bus. One of the purposes of the UTOPIA standard is to define a uniform interface between ATM microcircuits for transmission of data between circuits operating in the ATM layer (ATM) and circuits operating in the physical layer (PHY). The problem of handling the setting of the EFCI bit as simply as possible in connection with microcircuits implementing the above interfaces arises since these circuits cannot at least at the present moment utilize e.g. the setting of the EFCI bit to indicate congestion.

When implementing a simple additional function (such as the setting of the EFCI bit) between two ATM circuits forming a similar interface between themselves, the most natural way would be for the additional function to implement the same interface standard as do ATM microcircuits (e.g. UTOPIA). Such a straightforward solution is illustrated in FIG. 2, showing two ATM microcircuits A and B, and between them a manipulation circuit 21 carrying out said additional function. Signals are denoted with the same reference numerals as in the UTOPIA standard; TxData is byte-wide data driven from the ATM layer to the physical layer, and RxData is byte-wide data driven from the physical layer to the ATM layer. In this case all parallel data lines (e.g. the whole ATM cell) are thus brought to the header manipulation circuit 21, where the cell is buffered, processed and then fed forward to the next ATM circuit. Six control signals, two of which are optional, have been defined in the UTOPIA interface in addition to the eight parallel data signals. The figure shows only signals TxSOC and RxSOC of these control signals, since they are utilized in the solution of the present invention. TxSOC (Start of Cell) is a signal asserted by the ATM layer when TxData contains the first valid byte of a cell. RxSOC again is a signal asserted by the physical layer when RxData contains the first byte of a cell.

As the example in FIG. 2 shows, the interface of the standard requires a large number of pins of the circuit implementing the additional function.

BRIEF SUMMARY OF THE INVENTION

It is an object of the present invention to provide a method of manipulating the ATM cell header, by means of which an additional function like the above (e.g. to set the EFCI bit) can be implemented simply when using circuits implementing a standard interface.

The idea of the invention is to lead, among the signals at the interface, only the one comprising the header bit to be manipulated by means of its own conductor via an additional circuit carrying out the manipulation, to search for the bit to be manipulated by counting the bytes of a cell starting from start of cell, to carry out the manipulation as a response to the right byte, and to lead the conductor corresponding to the manipulated bit from the additional circuit carrying out the manipulation to its own position (that corresponding to the bit) among the conductors having bypassed the additional circuit.

The solution of the invention allows the circuit carrying out the required additional function (e.g. setting of the EFCI bit) to be implemented with a minimum number of pins, and thus within a small area. In principle the method of the invention is applicable to the manipulation of whichever header bit whose position is known beforehand. Several bits may be manipulated simultaneously, the pin corresponding to the information on the position having to be included into the manipulation block if the bit concerned is not in the same signal conductor (but in a different byte) as the bit that has already been taken to be manipulated.

DESCRIPTION OF THE DRAWINGS

In the following the invention and its preferred embodiments will be described in greater detail with reference to examples in FIGS. 3 to 8 in the accompanying drawings, in which FIG. 2 illustrates a straightforward manner of implementing the manipulation of an ATM cell header bit.

DETAILED DESCRIPTION OF THE PRESENTLY PREFERRED EXEMPLARY EMBODIMENTS

In the UTOPIA interface data is defined as 8-bit or 16-bit depending on the bit rate (UTOPIA level 1 and level 2). The UTOPIA standard is described in more detail in ATM Forum documents *UTOPIA Level 2 Specification*, Version 0.8, ATM Forum PHY Workgroup, Apr. 10, 1995 or *UTOPIA Level 1 Specification*, 1994, from which an interested reader can find a more precise description.

Figures 1A, 1B, 1C:
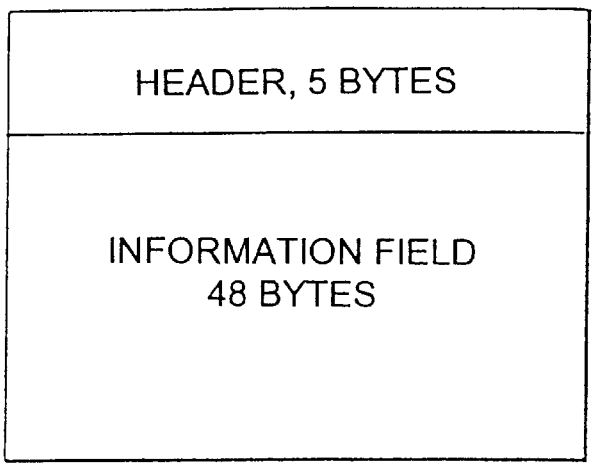
FIGS. 1a to 1c illustrate the general structure of an ATM cell.
Figure 3:
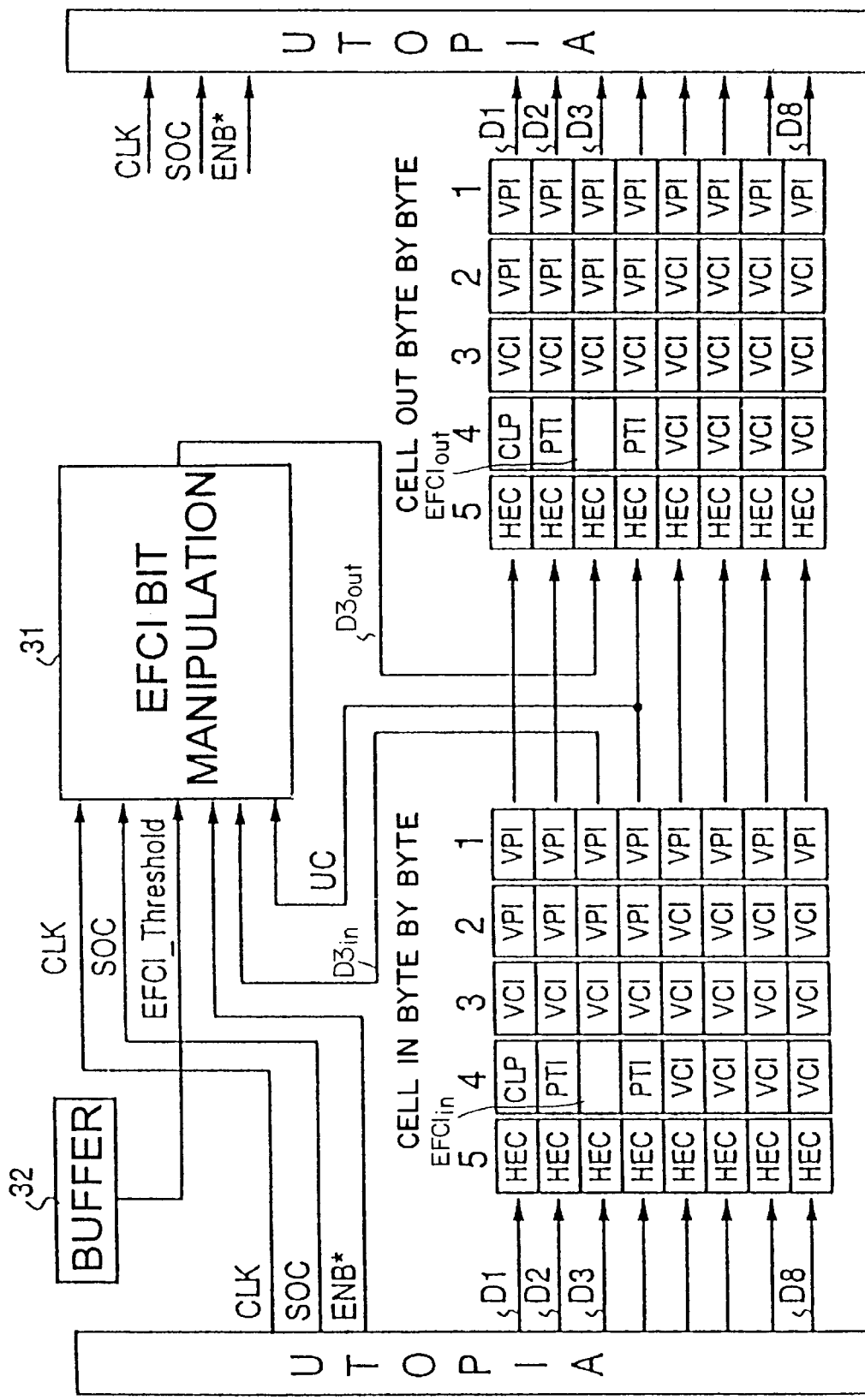
FIG. 3 illustrates the manner of the invention of implementing the manipulation of an ATM cell header bit.

FIG. 3 illustrates a manner of the invention of setting the EFCI bit in the UTOPIA interface. The EFCI bit is manipulated in a circuit 31, into which out of the UTOPIA interface signals a clock signal CLK, a Start of Cell signal SOC, an ENABLE signal ENB* and signals of data conductors D3 and D4 are led. When active, an ENB signal * indicates that data transmission is in process. An EFCI_Threshold signal, the only signal from outside the UTOPIA interface, is also led to the manipulation circuit. This signal indicates whether the EFCI bit is to be set (in user cells) to value "1", indicating that congestion has been detected. Information on congestion can be received from e.g. an ATM device buffer 32 when its fill rate has exceeded a given predetermined limit.

A SOC signal received by the manipulation circuit 31 indicates when data from the UTOPIA interface comprises the first byte (denoted in the Figure by reference numeral 1) of the cell.

According to the invention, the data conductor (i.e. D3) corresponding to the bit to be manipulated (EFCI) is led to the manipulation circuit 31 and the other data conductors (D1, D2 and D4 to D8) are led directly past the manipulation circuit. Additionally, the signal of the data conductor D4 is led to the manipulation circuit in order for the manipulation circuit to receive information on when a user cell is concerned (cf. the above table). This signal is denoted by reference UC. The bit to be manipulated is searched for in circuit 31 by counting from start of cell up to the byte comprising the bit to be manipulated. Counting is allowed only when the ENB* signal is active. When the counter has reached the desired value, the bit is manipulated. An output conductor $D3_{out}$ corresponding to the manipulated bit is led from the manipulation circuit to its own position among the conductors that bypassed the circuit, the byte-wide data being again assembled, the EFCI bit, however, having its manipulated value. Even though several signals are led to the manipulations circuit, the signal corresponding to the header bit to be manipulated is the only one to pass through the manipulation circuit (i.e. the circuit has only one output).

Figure 4:
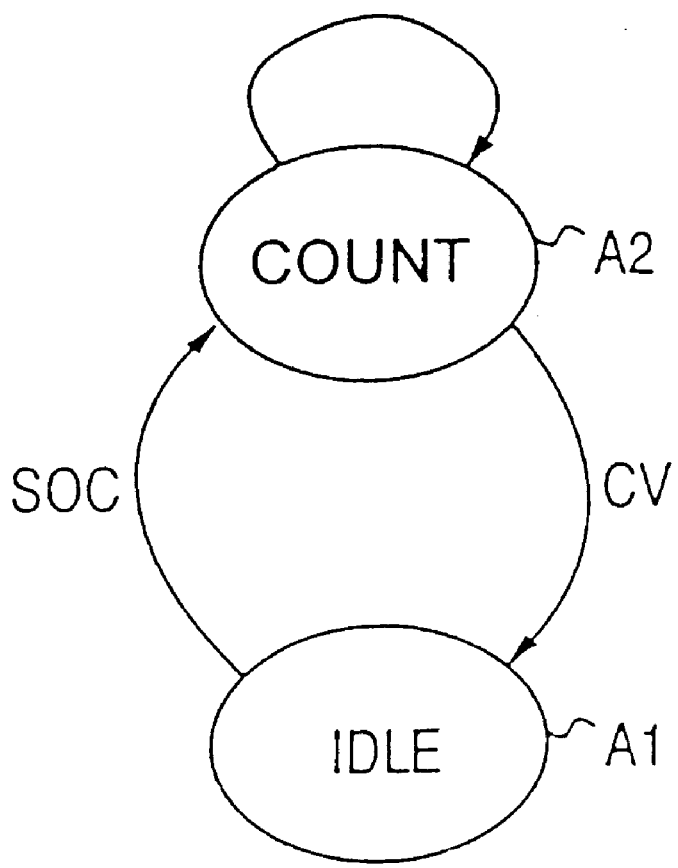
FIG. 4 illustrates the operation of the manipulation circuit shown in FIG. 3.

FIG. 4 illustrates the function of a manipulation circuit. The circuit has two modes: idle mode A1 and counting mode A2. In idle mode the circuit waits until it gets information on the start of a cell. This occurring, (signal SOC becoming active) the circuit switches to counting mode A2 and starts the internal counter (shown in FIG. 5 with reference numeral 50) of the circuit. Hence the counter counts, synchronized by the clock signal, up to the desired header bit (fourth bit in an EFCI byte). When the right byte has been reached, the right bit of the byte has also been reached, since only the conductor corresponding to that bit has been branched to be manipulated. Once the counter has beached the desired count CV (e.g. four), and if the bit of the conductor D4 indicates that a user cell is concerned, bit manipulation is carried out and the circuit returns to mode A1, and as a result the counter is also set to zero. At bytes other than the byte corresponding to the counter limit value (four), the output signal of the circuit 31 has the same value as its input signal, i.e. the value of the bit concerned is in no way affected.

It is recommendable to apply combinatorial manipulation to a single cell (by simple combination logic following Boolean logic). That is, manipulation is carried out immediately when information has been received to the effect that the right bit position has been found (in time and place). Thus the manipulated bit can join the other (non-manipulated) bits as soon as possible.

Figure 5:
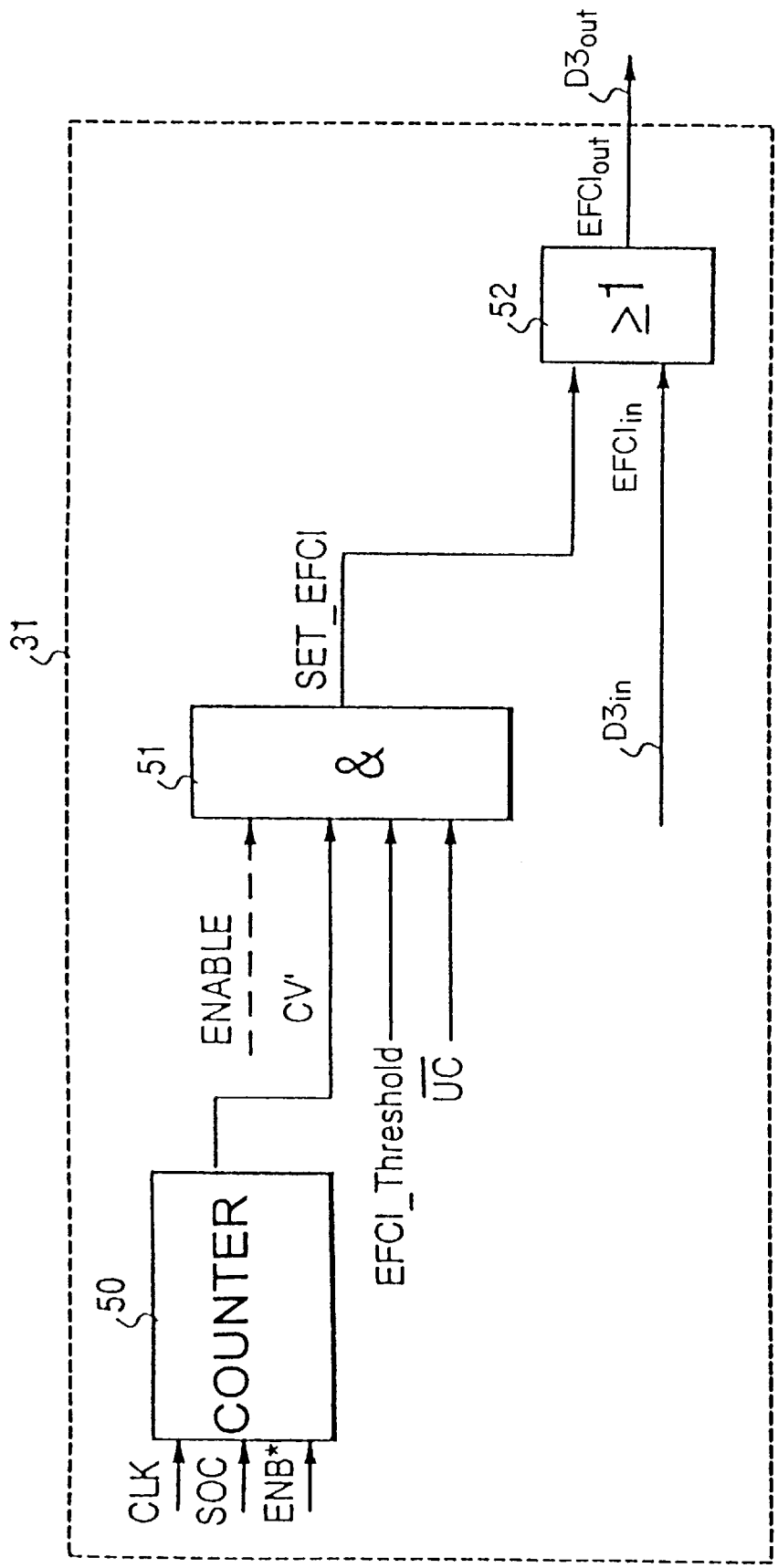
FIG. 5 shows an application of a manipulation circuit.
Figure 6:
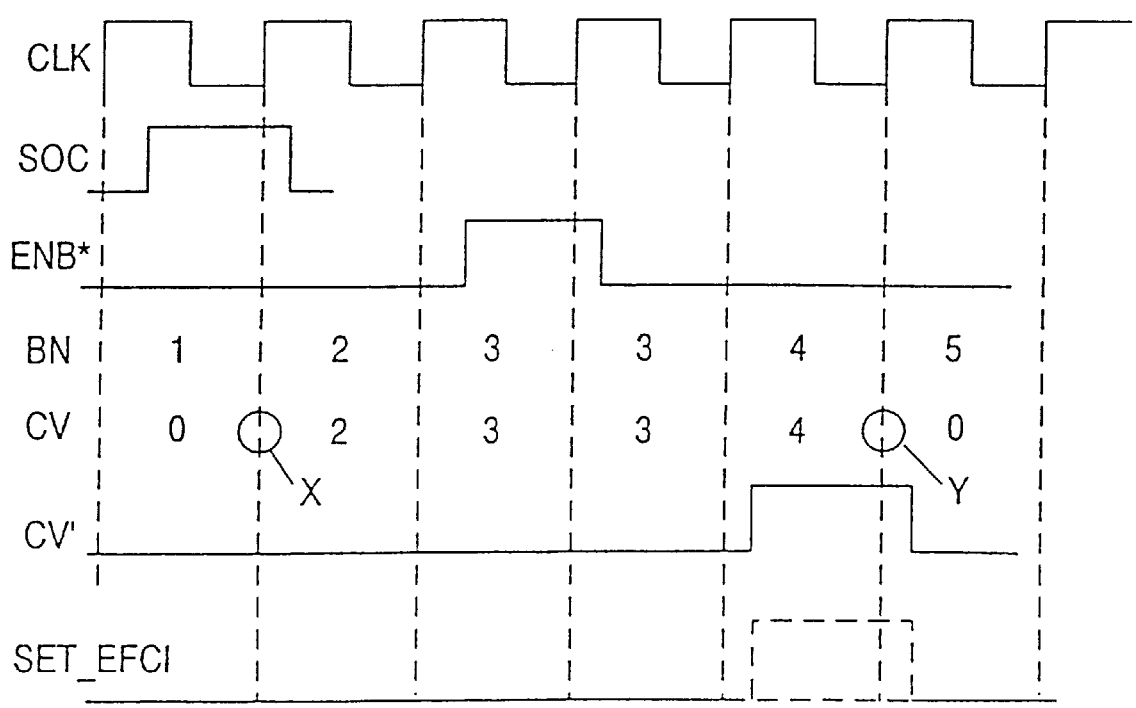
FIG. 6 is a timing diagram of the manipulation circuit of FIG. 5.

FIG. 5 shows an example of implementing combination logic and FIG. 6 shows a corresponding timing diagram. The output signal CV' (in a logical state "1" when counter value is four, i.e. the fourth byte of a cell is concerned) of the above counter 50, an inverted signal UC (having the value one when a user cell is concerned) of the signal conductor D4, and the EF-Cl_Threshold signal (having the value one when congestion has been detected) are led to an AND gate 51. A SET_EFCI output signal (in a logical one state when all input signals have simultaneously the value one) of the AND gate is connected to the first input of an OR gate 52. An EFCI$_{in}$ signal received from an input conductor D3$_{in}$ is coupled to another input of the OR gate. That is, the OR gate converts an incoming signal (an EFCI bit) with the value "zero" to an output signal with the value "one" when all signals incoming to the AND gate are in a state one. A fourth input signal ENABLE for indicating when the manipulation of the invention is effective can be added to the AND gate (e.g. to control the manipulation).

In FIG. 6, the instant when the counter switches to counting mode (A2) starting with a given value, e.g. two, is denoted with reference X. The instant when the counter switches back to idle mode (A1) and is reset to a given predetermined value, e.g. zero, is denoted with reference Y. A running byte number is denoted by reference BN and the value of the counter by reference CV. As can be seen from the Figure, data transmission stops when the ENB* signal changes its state (at byte three).

The significance of the delay encountered by a single bit to be manipulated is minimal when implemented in a combinatorial way, since bit manipulation in microcircuits only takes a fraction of the cycle of the byte clock available. Thus the bit has had time to change long before decisions on the byte concerned are made at the next interface. As long as the change occurs faster than the time corresponding to the clock cycle of the byte clock used, byte data is sufficiently stable in a decision-making process (which usually takes place on the rising edge of the clock).

Figure 7:
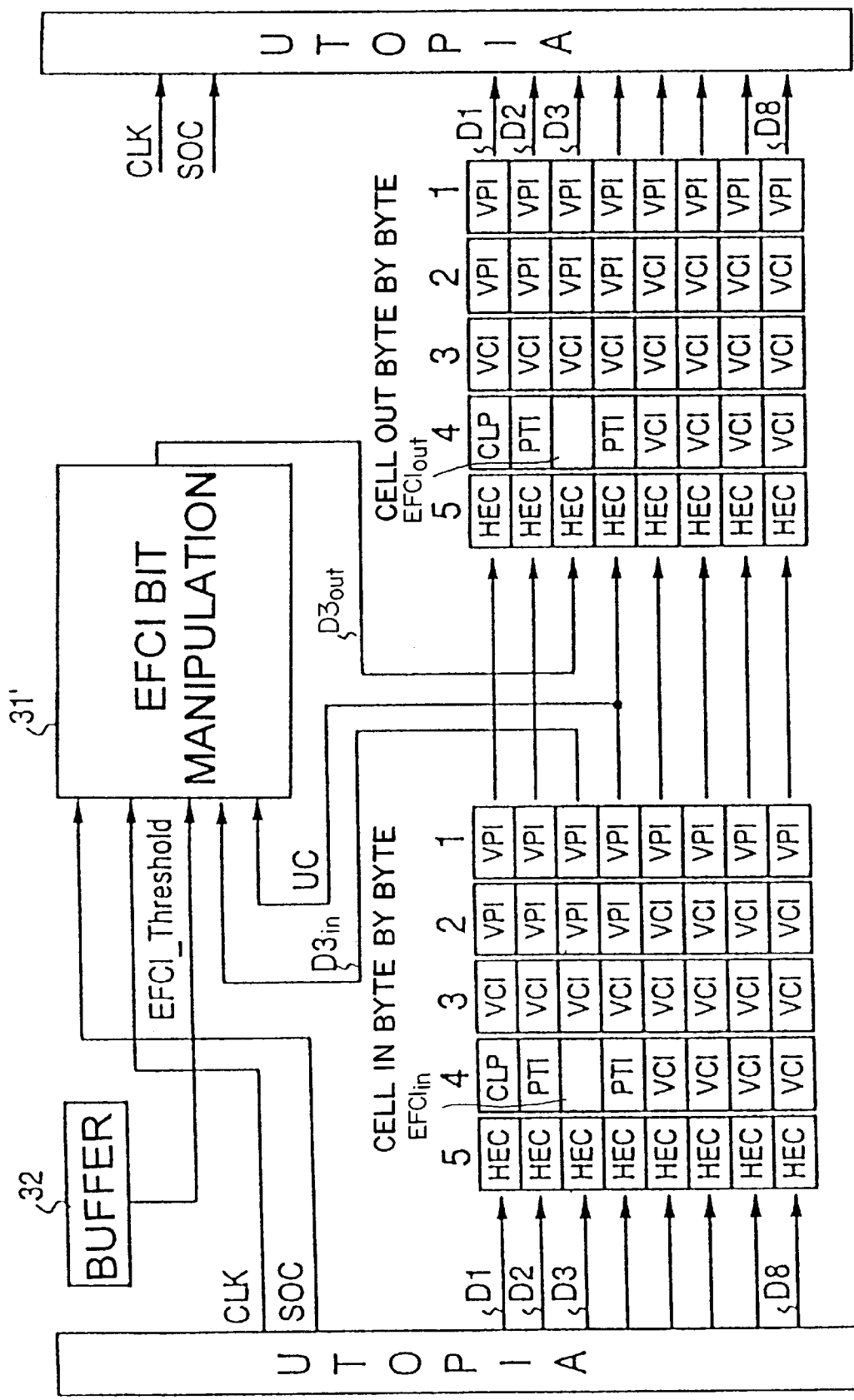
FIG. 7 illustrates an alternative manner of implementing the manipulation of an ATM cell header bit.
Figure 8:
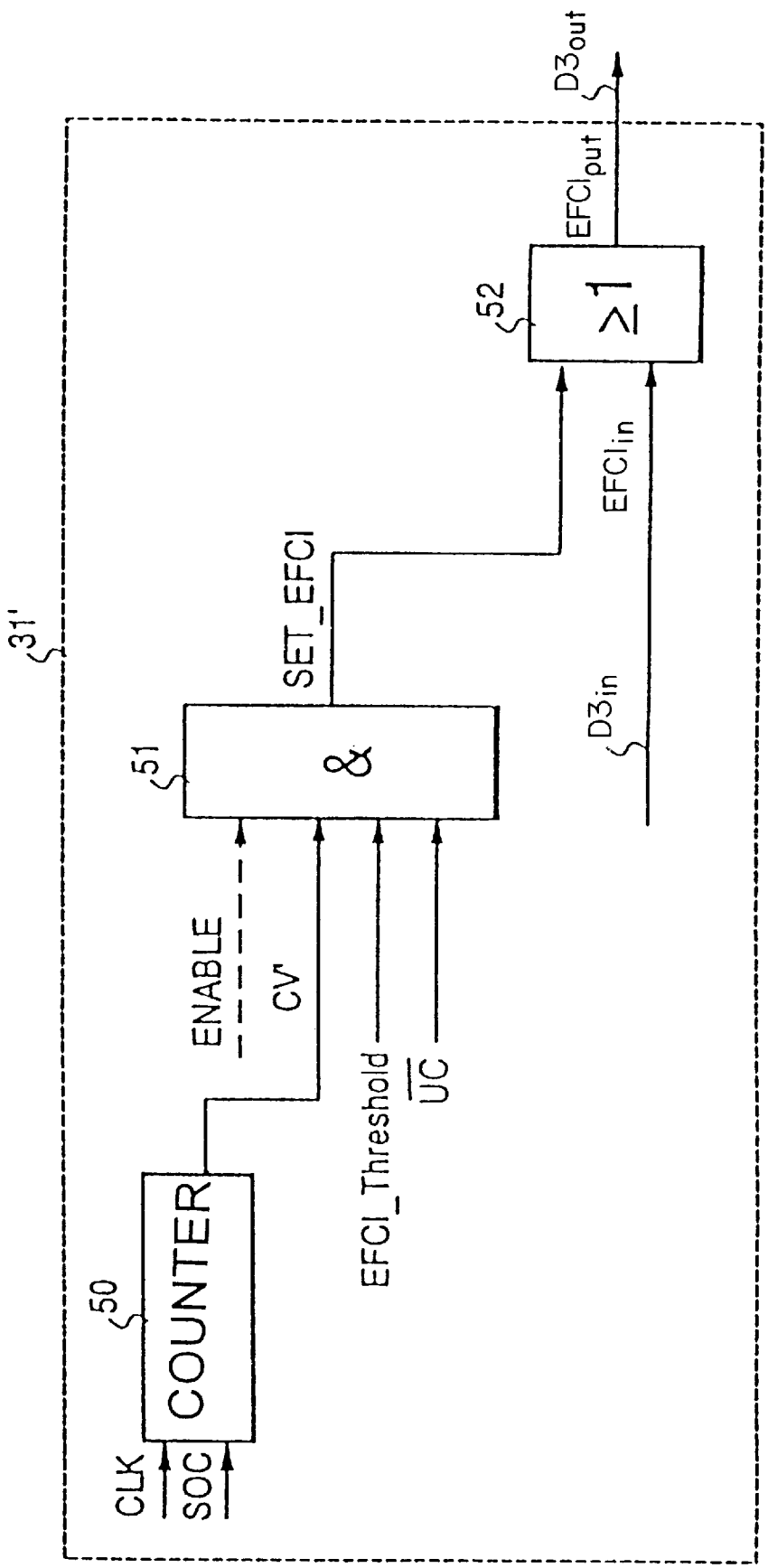
FIG. 8 illustrates a manipulation circuit according to FIG. 7.

The ENB* signal manages flow control so that when transmission is disconnected, the state of the ENB* signal changes (cf. FIG. 6). If the intention is to implement a modified UTOPIA interface without the above byte-based flow control and with e.g. only cell-based flow control which can be managed with the SOC signal, the ENB* signal can be totally omitted. Such an alternative is shown in FIGS. 7 and 8 in which a modified manipulation circuit is denoted by reference numeral 31'. As can be seen from FIGS. 5 and 8, the modified manipulation circuit corresponds to the above except that the ENB* signal is not used at all.

Even though the invention has been explained in the above with reference to examples in accordance with the accompanying drawings, it is obvious that the invention is not restricted to them but can be modified within the scope of the inventive idea disclosed in the above and in the attached claims. Although the addition of an EFCI bit was presented above in only one transmission direction, the device can operate in a corresponding way in both transmission directions. Although the implementation of the additional function was presented above in connection with the UTOPIA interface, a conventional 8-bit parallel bus, for example, could be used instead. Thus it is only essential that the bits of the bytes are in parallel and that the first byte of each cell is known. Thus, the number of parallel data conductors is neither essential.

What is claimed is:

1. A method of manipulating bits of a header field of an Asynchronous Transfer Mode (ATM) cell, wherein the ATM cell is transferred via an interface where each byte of the cell appears in a parallel form on a plurality of parallel data conductors and where information on the start of cell is available, the method comprising:

leading data conductors corresponding to the bits to be manipulated to a manipulation circuit for carrying out the manipulation, and leading other data conductors past the circuit;

searching for a bit to be manipulated by counting from a start of a cell up to a byte containing the bit to be manipulated, after which the bit is manipulated; and leading an output conductor corresponding to the manipulated bit from the manipulation circuit to its own position among the data conductors that bypassed the manipulation circuit.

2. A method as claimed in claim 1, wherein the bit to be manipulated is the EFCI bit of the ATM cell.

3. A method as claimed in claim 2, further comprising obtaining information as to whether a user cell relates to a data conductor bypassing the manipulation circuit.

4. A method as claimed in claim 2, further comprising taking a signal allowing byte-specific counting to the manipulation circuit in order to allow for byte-based flow control.

5. A method as claimed in claim 2, wherein the manipulation of the EFCI bit depends on the fill rate of a buffer in an ATM device, so that manipulation is carried out when the fill rate of the buffer exceeds a predetermined limit.

6. A method as claimed in claim 1, the method further comprising: using the same circuit to manipulate more than one bit.

* * * * *